United States Patent [19]
Bodart et al.

[11] Patent Number: 5,300,367
[45] Date of Patent: Apr. 5, 1994

[54] METALLIC STRUCTURAL PANEL AND METHOD OF FABRICATION

[75] Inventors: Edward D. Bodart, Eureka; Gerald T. Morgenthaler, Florissant, both of Mo.

[73] Assignee: McDonnell Douglas Corporation, St. Louis, Mo.

[21] Appl. No.: 743,706

[22] Filed: Aug. 12, 1991

[51] Int. Cl.$^5$ .................... B32B 3/20; B23K 101/02; B23K 101/04

[52] U.S. Cl. .................. 428/586; 428/593; 228/157; 228/193

[58] Field of Search ............... 428/593, 586; 228/118, 228/157, 181, 183, 193

[56] References Cited

U.S. PATENT DOCUMENTS

| | | | |
|---|---|---|---|
| 3,123,907 | 3/1964 | Thomas | 228/181 |
| 3,340,589 | 9/1967 | Jaeger | 228/118 |
| 3,349,464 | 10/1967 | Becker et al. | 228/157 |
| 4,217,397 | 8/1980 | Hayase et al. | 228/157 |
| 4,220,276 | 9/1980 | Weisert et al. | 228/193 |
| 4,294,419 | 10/1981 | Fouse et al. | 228/157 |
| 4,331,284 | 5/1982 | Schulz et al. | 228/157 |
| 4,509,671 | 4/1985 | Weissert | 228/193 |
| 4,595,297 | 6/1986 | Liu et al. | 228/183 |
| 4,597,946 | 7/1986 | Ward | 228/183 |
| 4,607,783 | 8/1986 | Mansbridge et al. | 228/265 |
| 4,632,296 | 12/1986 | Mansbridge et al. | 420/902 |
| 5,055,143 | 10/1991 | Runyan et al. | 428/593 |
| 5,118,571 | 6/1992 | Peterson | 428/593 |
| 5,141,146 | 8/1992 | Yasui | 228/193 |

FOREIGN PATENT DOCUMENTS

2647382 9/1990 France ................ 428/593

*Primary Examiner*—John Zimmerman
*Attorney, Agent, or Firm*—Timothy H. Courson; Benjamin Hudson, Jr.; Guy R. Gosnell

[57] ABSTRACT

A metallic structural panel having a plurality of internal passages separated by supporting ribs and its method of fabrication. The fabrication assembly of the metallic structural panel is essentially comprised of a housing defining an internal cavity, a plurality of internal tubes, a means for segregating the internal cavity into a pressurized and an evacuation section and a means for establishing a pressure differential between the pressurized and evacuation sections. The metallic structural panel is superplastically formed and diffusion bonded such that independent passages are formed between supporting ribs within the internal cavity of the housing. Embodiments of the fabrication assembly for manufacturing metallic structural panel are also provided which produced a curved structural panel. These embodiments utilize a curved housing along with either curved end plates or curved internal tubes, depending on whether the supporting ribs are desired to be straight or curved, respectively. If enhanced heat transfer is desired, there is provided an additional embodiment which incorporates a network of cooling tubes.

16 Claims, 5 Drawing Sheets

METALLIC STRUCTURAL PANEL AND METHOD OF FABRICATION

BACKGROUND OF THE INVENTION

The present invention relates generally to the production of superplastically formed, metal alloy structures and more particularly to the production of metallic structural panels superplastically formed from metal tubes contained within and diffusion bonded to a metallic pan, and the associated methods for producing such structures.

Superplasticity is the characteristic demonstrated by certain metals to develop unusually high tensile elongations with minimum necking when deformed within a limited temperature and strain rate range. This characteristic, peculiar to certain metal and metal alloys, has been known in the art as applied to the production of complex shapes. It is further known that at these same superplastic forming temperatures, the same materials can be diffusion bonded with the application of pressure at contacting surfaces.

The prior art relating to superplastic forming of metallic sandwich structures, as well as metallic structural panels, is exemplified by U.S. Pat. Nos. 4,217,397 and 4,304,821 (hereinafter the '397 and the '821 patents, respectively), both of which issued to Hayase et al. The disclosure of both the '397 and '821 patents are hereby incorporated by reference. The '397 patent discloses a four sheet metallic sandwich structure, while the '821 patent discloses the corresponding method of fabricating the structure disclosed in the '397 patent.

The '397 patent discloses a metallic sandwich structure in which metal worksheets are joined by an intermittent weld. The joined sheets are thereafter sealed by a continuous weld to form an expandable envelope. Following the placement of the joined sheets in a limiting structure, inert gas pressure is applied to the interior of the joined sheets as well as the interior of other worksheets if other worksheets are utilized so that the structure diffusion bonds to itself or other worksheets. The core configuration of the structure is determined by the intermittent weld pattern. Face sheets may by formed for the sandwich structure from one sheet of the joined sheets or by additional sheets which may be inserted in the limiting fixture prior to the envelope's expansion such that the envelope will be expanded against and diffusion bonded to the inserted face sheets.

The metallic sandwich structure disclosed by the '397 patent and its method of preparation disclosed by the '821 patent are of limited utility in several areas. For example, in many applications it is desirable to introduce coolant to the interior of a metallic sandwich structure to absorb the heat which has built up within the structure. However, the complex series of intermittent welds which join the interior metal worksheets restrict the ability of coolant to flow through the structure in any controlled manner. While it is possible to design a metal sandwich structure as disclosed in the '397 patent which does permit controlled coolant flow, it is an onerous task as the series of intermittent welds are necessarily interconnected in order to have an even pressure distribution upon fabrication. This interconnection of the intermittent welds results in multiple paths for coolant flow and ultimately uneven heat extraction.

The metallic sandwich structure disclosed by the '397 patent is also limited in the type of shapes which it may form and the thickness of the resulting structure. The structure of the '397 patent has not been suitable for tightly rounded shapes, such as the leading edge of an aircraft which requires a small radius of curvature. For the '397 patent to be utilized for highly curved structures, the weld nugget line of the structure must be placed in the center of the curve for best results. However, locating this weld nugget line in the curve's centerline is a difficult alignment process and may be virtually impossible with some potential weld configurations.

Additionally, the metal sandwich structure of the '397 patent is not easily manufacturable in thicknesses of less than one-half inch or greater than four inches. For structures which must be greater than four inches in width, the metal sheets forming the structure tend to be stretched too far and become thinned out. The resulting sandwich structure is therefore weak or may not form the pattern which was anticipated by the intermittent weld pattern. Alternatively, for thin structures less than one-half inch, a typical sandwich structure formed from four sheets may not diffusion bond as completely as desired. For example, the joined sheets in the region of an intermittent weld will expand upon the application of increased pressure and may not form tightly enough to one another near the weld so as to bond to the interior two sheets. Thus, the resulting sandwich structure may not be as unified or as strong as desired.

It would be desirable to develop a metallic structural panel through which coolant could flow to provide enhanced heat transfer capabilities. It would also be desirable for the metallic structural panel to be capable of being formed in shapes with complex curvatures and shapes requiring small radii of curvature. Furthermore, it would be desirable if the metallic structural panel were capable of being fabricated in both very thin and thick widths.

SUMMARY OF THE INVENTION

There is provided by this invention a metallic structural panel and its method of fabrication. The fabrication assembly of the metallic structural panel is essentially comprised of a housing defining an internal cavity, a plurality of internal tubes, a means for segregating the internal cavity into a pressurized and an evacuation section and a means for establishing a pressure differential between the pressurized and evacuation sections.

In a first embodiment of the fabrication assembly, the housing is comprised of a pan and a top sheet. Additionally, the means for segregating the internal cavity is comprised of a pair of end plates to which the plurality of internal tubes are rigidly affixed. The combination of the end plates and the internal tubes are placed within the internal cavity of the pan and the top sheet is bonded thereto. The means for establishing a pressure differential is typically a pair of evacuation and expansion tubes which provide access to the internal cavity of the pan and top sheet combination. While only one pair of evacuation and expansion tubes need be used, it is possible to utilize multiple pairs of these tubes to access the internal cavity of the housing.

In an alternative embodiment of the fabrication assembly for the metallic structural panel, the housing is comprised of a pan, a top sheet and a pair of manifolds.

In a second alternative embodiment of the fabrication assembly for the metallic structural panel, the housing is comprised of a pair of substantially similar face sheets which serve to define the internal cavity.

The formation process for the fabrication assembly begins by placing the fabrication assembly in a limiting structure which will define the shape of the final metallic structural panel. Initially, the space within the interior of the housing is repetitively purged of oxygen with an inert gas. The fabrication assembly and limiting structure is next placed in an elevated temperature environment and a pressure differential is established between the interior and exterior of the internal tubes by reducing pressure in the evacuation section of the internal cavity of the housing while simultaneously increasing the pressure within the pressurized section of the internal cavity of the housing. Due to the pressure differential and the increased temperature, the internal tubes of the fabrication assembly superplastically form and diffusion bond to themselves and to the housing such that independent passages are formed between supporting ribs within the internal cavity of the housing. Once the internal tubes have superplastically formed and diffusion bonded, the temperature is decreased and the pressure differential is removed such that the structural panel may be removed from the limiting structure and trimmed to form a panel of the desired shape.

Embodiments of the fabrication assembly for manufacturing metallic structural panel are also provided which produced a curved structural panel. These embodiments utilize a curved housing along with either curved end plates or curved internal tubes, depending on whether the supporting ribs are desired to be straight or curved, respectively.

The passages established within the structural panel may be used for heat transfer from the surface on the panel, while the ribs defining the passages serve to reinforce and strengthen the structure.

If enhanced heat transfer is desired, there is provided an additional embodiment which incorporates a network of cooling tubes. The cooling tubes are composed of a material which, while it is not capable of superplastic forming and diffusion bonding, is able to carry coolant which provides enhanced heat transfer but which would embrittle passages made of a material which is capable of being superplastically formed and diffusion bonded.

DETAILED DESCRIPTION OF THE PREFERRED EMBODIMENT

As indicated above, the material to be superplastically formed must exhibit the characteristic of unusually high tensile elongation with minimum necking when deformed within a limited temperature and strain rate range. While several materials demonstrate these superplastic properties, titanium and its alloys are currently the best known forming materials. The superplastic temperature range varies with the specific alloy used, however, the temperature just below the phase transformation temperature is near optimum. This temperature for titanium alloys is near 1650° F. The best strain rate is actually determined experimentally for each configuration formed, however, it is generally in the range of $10^{-4}$ in./in./sec. ($10^{-4}$ mm/mm/sec) for balanced deformation. If the strain rate is too rapid, it will cause blowout of the material being deformed, and if the rate is too slow, the material loses some of its plasticity.

In addition to the superplastic properties, the material to be formed is preferably capable of diffusion bonding. Diffusion bonding, as used herein, refers to the solid-state joining of the surfaces of similar or dissimilar metals by applying heat and pressure for a time duration to cause co-mingling of the atoms at the joint interface.

By way of distinction, fusion bonding or welding, as used herein, refers to the metallurgical joining or welding of the surfaces of similar or dissimilar metals by applying heat so as to cause the materials at the joint interface to reach the liquid or plastic state and thereby merge into a unified whole.

Figure 1:
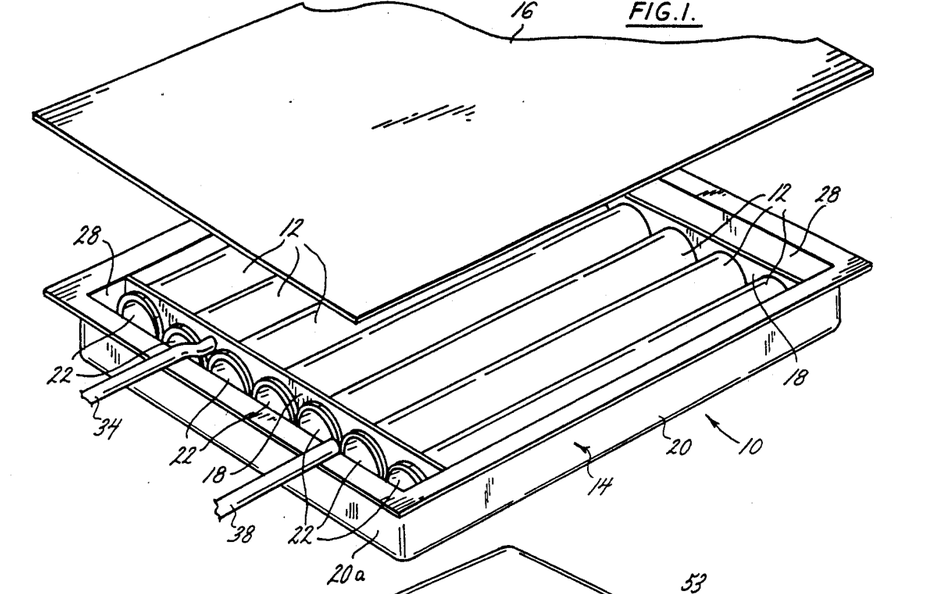
FIG. 1 is an exploded perspective view of a first embodiment of the metallic structural panel incorporating the principles of this invention.

The first embodiment of a fabrication assembly 10 prior to being superplastically formed into a metallic structural panel according to the subject invention is shown in FIG. 1. The fabrication assembly 10 is primarily comprised of a housing defining an internal cavity, a plurality of internal tubes 12, means for segregating the internal cavity into pressurized and an evacuation section, and means for establishing a pressure differential between the pressurized and evacuation sections.

In the first embodiment shown in FIG. 1 the housing is comprised of a pan 14 and a top sheet 16. Furthermore, the means for segregating the internal cavity is comprised of a pair of end plates 18 and the means for establishing a pressure differential is comprised of an evacuation tube 34 and an expansion tube 38.

The internal tubes 12 may be formed of any metal which exhibits superplasticity but are preferably formed from a titanium alloy or aluminum alloy. Internal tubes 12 of titanium alloy or aluminum alloy are preferable due to their predictable behavior in superplastic forming conditions. The internal tubes 12 all of which are of the same length 11 may be of any tubular geometric shape but are preferably circular in cross section. The tubes 12, which are generally arranged parallel to one another, must have no openings other than a single opening at each end of the tube. The diameter 13 of the internal tubes 12 is generally slightly smaller than the height 19 of the side walls 20 of the housing, hereinafter described. Also, the number of the internal tubes 12 is variable with the resulting structural panel becoming broader as more tubes are used.

The means for segregating the internal cavity is preferably comprised of a pair of metallic end plates 18 as shown in FIG. 1. The metallic end plates 18 have a plurality of openings 22 wherein the number of openings 22 is equal to the number of internal tubes 12. Furthermore, the shape and size of the openings 22 is the same as a cross sectional shape and size of the internal tubes 12. The external dimensions of the end plates 18 are equivalent to the internal dimensions of the housing as hereinafter described. The ends of the internal tubes 12 are rigidly affixed to the end plates 18 such that the openings 22 of the end plates 18 and the tubes 12 are aligned. The internal tubes 12 and the end plates 18 should be affixed such that there is a sealed joint completely about the periphery of the opening 22.

Figure 2:
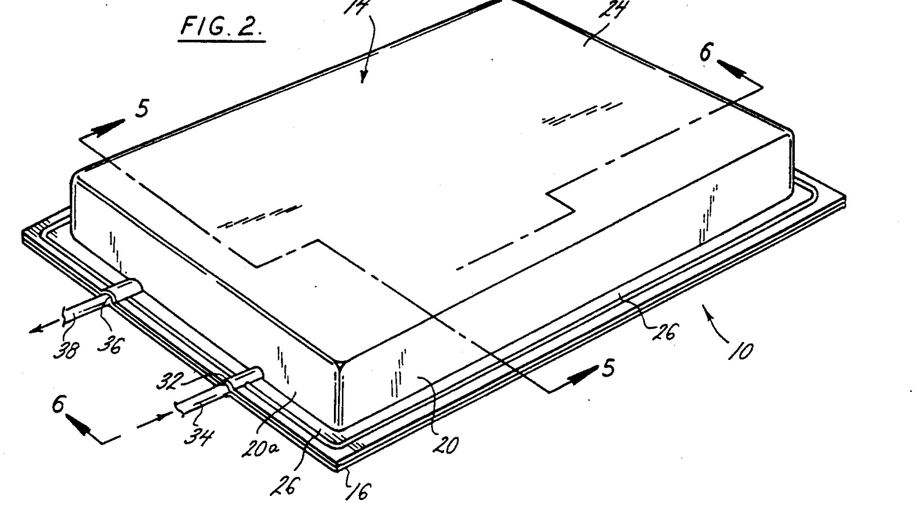
FIG. 2 is a perspective view of a fabrication assembly of the first embodiment of the metallic structural panel.

The housing is preferably comprised of a pan 14 and a top sheet 16 which form the exterior surface of the metallic structural panel as shown in FIGS. 1 and 2. The pan 14 and the top sheet 16 may be formed from any metallic material, but most commonly are formed from a titanium alloy or an aluminum alloy. In a first embodiment of the fabrication assembly 10, the pan 14 is formed from a continuous piece of metal that has three sections—a face sheet section 24, a sidewall section 20, and a flanged edge section 26. The length 23 of the typically rectangular face sheet section 24 is chosen to be somewhat greater than the length 11 of the internal tubes 12 while the width 25 of the face sheet section 24 is equivalent to the width 17 of the end plates 18. A sidewall 20 is contiguous with each side of the generally rectangular face sheet section 24. The sidewalls 20 are formed at a draft angle to the face sheet section 24. The draft angle is measured from a line perpendicular to the face sheet section 24. While the draft angle may be any suitable angle so as to facilitate the removal of the housing from the containment die, it is preferably 15°. The depth of the pan 14 which is actually the height 19 of the sidewalls 20 is equal to the height 21 of the end plates 18. The flanged edge 26 of the pan 14, formed contiguously with the sidewalls 20, extends about the periphery of the pan 14 and may be of any width 27 that is sufficient to allow a weld to be formed upon it. The metallic top sheet 16 is sized to an equal length 29 and width 31 as that formed by the combination of the face sheet section 24 of the pan 14 and the flanged edge 26 extending about the periphery of the pan 14.

Figure 3:
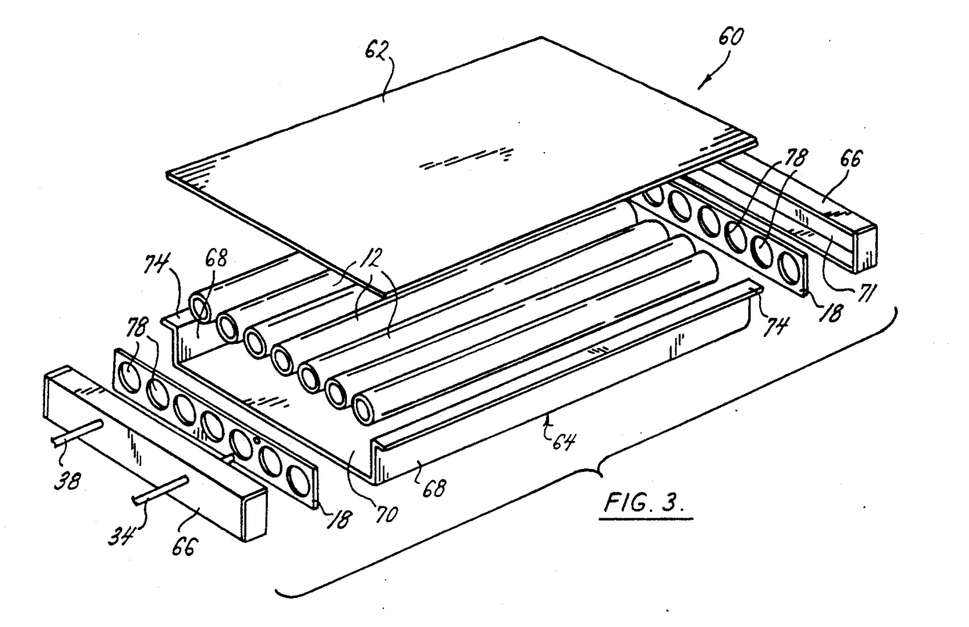
FIG. 3 is an exploded perspective view of an alternative embodiment of the metallic structural panel in which separate manifold sections are utilized.

In an alternative embodiment shown in FIG. 3 the housing is comprised of a pan 64, a top sheet 62 and a pair of manifolds 66. In this alternative embodiment the top sheet 62 is similar to that previously utilized with its length 63 approximately equal to the length 11 of the internal tubes. The pan 64 has also been modified to have only two side walls 68 instead of the four side walls 20 identified previously. The two side walls 68 of the pan 64 are along the edges of the face sheet section 70 of the pan 64 which are substantially parallel to the center lines of the internal tubes 12. The pair of manifolds which are utilized with this embodiment 60 are hollow rectangular structures whose height 67 and width 69 are equal to the height 21 and width 17 of an end plate 18. The length of each manifold 66 is discretionary but typically is within the range of 1 to 2 inches. The manifold 66 has five metallic walls and one side 71 which is open. The open side 71 is chosen to be one of the sides which has dimensions width and height equivalent to the end plate 18. Regardless of the particular components of the housing, the housing in either embodiment must define an internal cavity which is sealed from the external environment.

This alternative embodiment of the housing is initially fabricated by affixing the manifolds to the open ends of the pan 64 as shown in FIG. 3. Thus, when the top sheet 62 is bonded to the flanged edge of the pan, the housing will also define an internal cavity which is distinct from the external environment.

Figure 4:
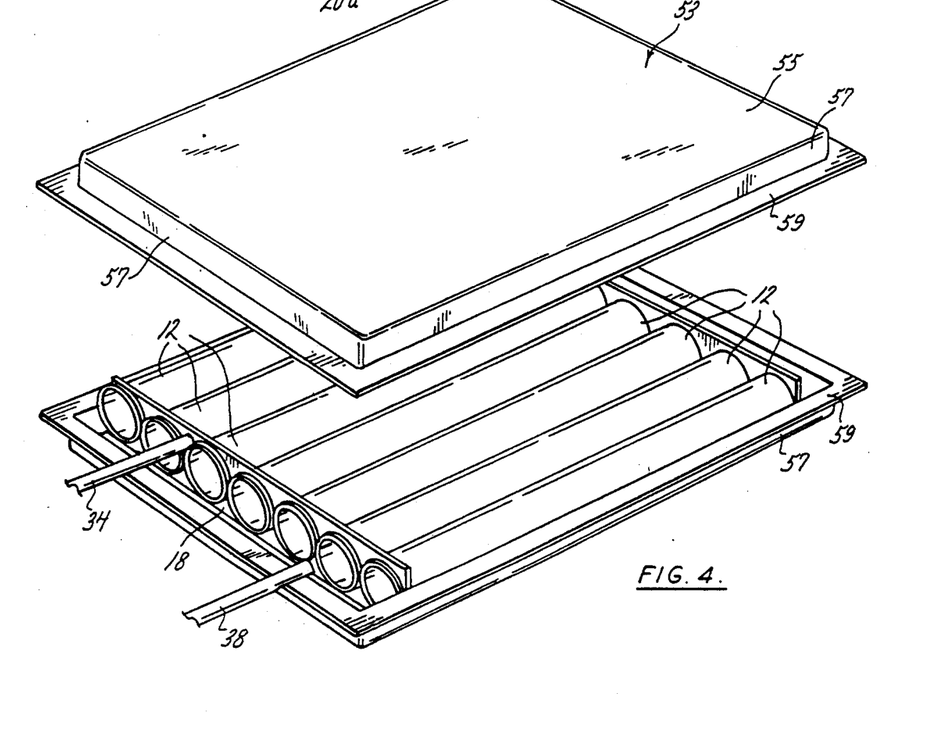
FIG. 4 is an exploded perspective view of a second alternative embodiment of the metallic structural panel in which substantially similar face sheets are utilized.

In a second alternative embodiment shown in FIG. 4, the housing is comprised of a pair of concave facesheets 59 which are comprised of three sections: a face sheet section 59a, a sidewall section 59b, and a flanged edged section 59c. The remaining components of the second alternative embodiment shown in FIG. 4 are similar to those previously discussed with respect to the first embodiment. Additionally, the second alternative embodiment is fabricated and operated in a similar manner to the first embodiment whose fabrication and operation is hereinafter described. The symmetry of the second alternative embodiments facesheets 59, however, allows the combination of the end plates 18 and internal tubes 12 to be placed in either of the two concave face sheets 59 with the second concave face sheet face sheet being secured so as to cover the combination within the first face sheet. This alternative placement approach is unlike that of the first embodiment which requires the combination to be placed within the pan 14 and covered with the top sheet 16.

Returning to the first embodiment shown in FIGS. 1 and 2, the assembly process is begun by first placing the combination of the internal tubes 12 and the end plates 18 rigidly affixed thereto in the pan 14. While the width 25 of the pan 14 is equal to the width 17 of the end plates 18, the length 23 of the pan 14 is longer than the length 11 of the internal tubes 12 in this preferred embodiment. Thus, the combination of the internal tubes 12 and the end plates 18 is generally centered lengthwise within the pan 14 such that approximately equal distances remain between the end plates 18 and the side walls 20 of the pan 14. This volume between the end plates 18 and the pan's side walls 20 is turned to manifold space 28.

In the alternative embodiment shown in FIG. 3, the length of the internal tubes 12 is generally equivalent to the length of the pan such that the combination of the internal tubes 12 and the end plates 18 may be aligned lengthwise within the pan.

In any of the embodiments, the edges of the end plates 18 which are adjacent to a surface of a pan, either the face sheet section or the side walls, are then rigidly affixed to the pan such as by welding. The means for rigidly affixing the end plates 18 to the pan must form a continuous seal between the end plates 18 and the pan.

Figure 5:
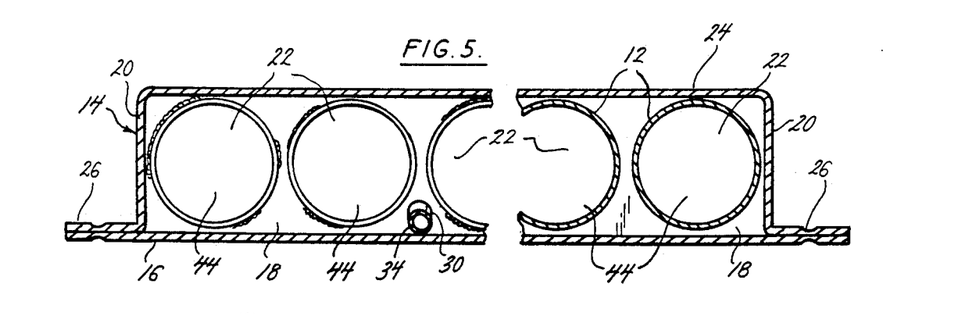
FIG. 5 is a sectional view of the first embodiment of the metallic structural panel taken along line 5—5 in FIG. 2.
Figure 6:
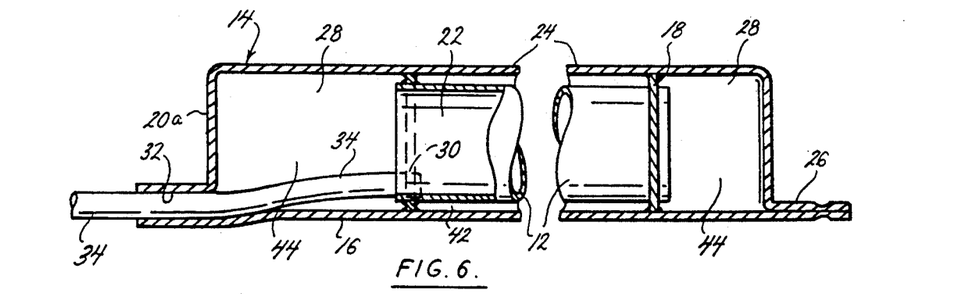
FIG. 6 is a sectional view of the first embodiment of the metallic structural panel taken along line 6—6 in FIG. 2.

As shown in FIGS. 5 and 6, the end plates 18 in any of the embodiments which have been affixed to the pan incorporate a opening 30 which is positioned between the openings 22 to which the internal tubes 12 are affixed. A similarly sized opening 32 is also positioned in the side wall 20a of the pan 14 such that it is axially aligned with the opening 30 and end plate 18a. The side wall 20a in which opening 32 is located is selected to be the side wall nearest to and parallel with the end plate 18 in which opening 30 is located. Evacuation tube 34 is placed through the opening 32 and side wall 20a and affixed to opening 30 in end plates 18a. The external diameter of evacuation tube 34 is selected to be approximately equal to the diameter of the openings 30 and 32 in the sidewall 20a and end plate 18a. A seal is also formed about evacuation tube 34 and opening 32 so as to form a seal. A second opening 36 is also incorporated in side wall 20a. Expansion tube 38 is rigidly affixed to opening 36 on side wall 20a to form a seam around the second opening 36. The external diameter of expansion tube 38 is also approximately equal to the diameter of the additional opening 36.

Following the placement of the evacuation tube 34 and the expansion tube 38, the top sheet 16 is bonded to the pan 14 as shown in FIGS. 5 and 6 with respect to the first embodiment. The bonding of the top sheet 16 is such that a continuous seam in formed about the perimeter of the top sheet 16 and the flanged edge 26 of the pan 14 so as to define the internal cavity 40 as the space between the top sheet 16 and the pan 14. The internal cavity 40 is now only accessible from the external environment through the evacuation tube 34 and the expansion tube 38 extending through side wall 20a of the pan 14. Additionally, a continuous seam is formed between the portion of the end plates 18 and the top sheet 16 which are in contact. Such a seam may be formed by means of an electron beam weld.

The bonding of the top sheet 62 and the formation of an internal cavity is identical to that previously described with the alternative embodiment in FIG. 3. The sealing of the end plates 18 to the side walls of the pan and the top sheet divides the internal cavity 40 into two sections, an evacuation section 42 and a pressurized section 44. The evacuation section 42 consists of the portion of the internal cavity 40 which is between the two end plates 18, the pan 14 and the top sheet 16, while also being outside of the internal tubes 12. The pressurized section 44 therefore consists of all the volume of the internal cavity 40 which is not a part of the evacuation section 42. More particularly, the pressurized section 44 for the preferred embodiment consists of the volume inside the interior tubes 12 as well as the manifold space 28 at each end of the pan 14 between end plates 18 and side walls 20. In a like manner, the pressurized section 44 of the alternative embodiment consists of the volume inside the interior tubes 12 as well as the volume within the manifolds 66 at each end of the housing.

Figures 7, 8, 10, 11:
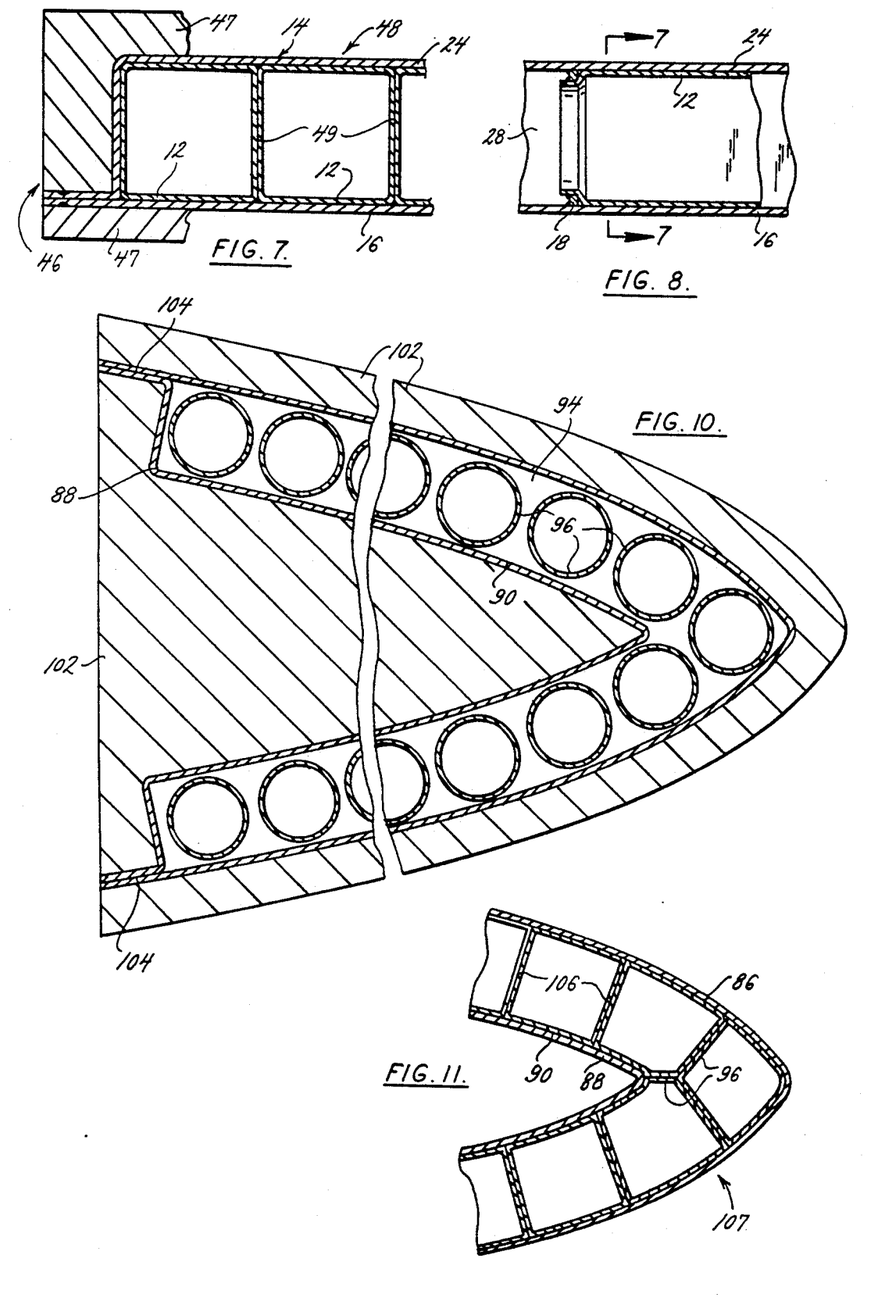
FIG. 7 is a sectional view of the first embodiment of the metallic structural panel taken along line 7—7 FIG. 8 in a limiting structure.
FIG. 8 is a side sectional view of the first embodiment of the metallic structural panel following its superplastic forming and diffusion bonding.
FIG. 10 is a sectional view of the first embodiment of the fabrication assembly for manufacturing curved metallic structural panels which has been placed in a limiting structure.
FIG. 11 is a sectional view of the first embodiment of the fabrication assembly for manufacturing curved metallic structural panels following the superplastic forming and diffusion bonding.

The complete fabrication assembly 10 is thereafter placed in a limiting structure 46, as illustrated in FIG. 7. The limiting structure 46 is formed from a pair of containment dies 47 which are clamped together. The limiting structure 46 serves to determine the shape of the resultant metallic structural panel as hereinafter discussed. The material from which the limiting structure 46 is made must demonstrate a suitable strength at the formation temperature for the metallic structural panel, such as 1650° F. for a titanium alloy structural panel. The only portions of the fabrication assembly 10 which protrude from the limiting structure 46 are the evacuation 34 and expansion 38 tubes which provide inlet ports to the internal cavity 40 of the assembly 10. An example of such a limiting structure 46 is a heated platen press which holds the structural panel together while also providing the environment of increased temperature required as hereinafter discussed.

An inert gas source (preferably argon) followed by a pressure regulator followed by a shutoff valve all of which have been omitted from the drawing, are next connected to the expansion tube 38 in an upstream direction. Similarly, there is a vacuum source, which has also been omitted from the drawing, connected to the evacuation tube 34 and the expansion tube 38 in such a manner that a vacuum may be applied to the pressurized section 44 and the evacuation section 42 of the internal cavity 40 separately, or in common. While the pressure required is a function of the thickness of the walls of the internal tubes 12 of the metallic structural panel, titanium internal tubes with walls in the 0.050 in. (127 mm) range can be expanded below 200 psi. It is conceivable that wall thicknesses requiring up to 1000 psi or higher are feasible.

In order to form the metallic sandwich structure, the fabrication assembly 10 is placed in a heated environment. While methods to obtain a heated environment are well known to those skilled in the art, suitable examples of such an environment are a heated platen press or an autoclave in which the entire assembly and limiting structure is placed. The internal cavity 40 of the fabrication assembly 10 is then purged of oxygen. Increased pressure is next applied to the space within the interior tubes 12 while the air within the cavity 40 surrounding the internal tubes 12 is evacuated. With the application of the appropriate temperature and pressure, the internal tubes 12 will superplastically expand to form rectangular passages within the outer face sheets 14 and 16. With the continued application of increased temperatures and the pressure differential, the internal tubes 12 will also diffusion bond to the outer face sheets 14 and 16 to form an integral metallic structural panel 48. The superplastic forming and diffusion bonding of the internal tubes 12 will form supporting ribs 49 between the top sheet 16 and the face sheet section 24 of the pan 14 as shown in FIG. 8.

More specifically, the metallic structural panel formation process is initiated by placing the fabrication assembly 10 in an environment of increased temperatures. While the temperature required to superplastically form the structure will vary with the type of metal utilized as is well known to those skilled in the art, 1650° F. is sufficient for superplastically forming titanium panels. The pressurized section 44 and the evacuation section 42 of the interior cavity 40 are next purged of any oxygen which they may contain. This purging is accomplished by alternatively and repeatedly flushing the internal cavity 40 with an inert gas, typically argon, which is introduced through the expansion 38 and evacuation 34 tubes and evacuating the internal cavity 40 by pumping down with a vacuum. The purging is performed to remove the oxygen from the internal cavity 40 since the presence of oxygen will cause the metal forming the internal tubes 12 to oxidize an thus not diffusion bond as readily.

The evacuation section 42 of the internal cavity 40 is next pressurized to a low pressure. While the evacuation section 42 is being pressurized, the pressure within the pressurized section 44 is increased.

The strain rate, which is important to balanced and stable forming, is determined by the rate of change of the differential gas pressure across the walls of the internal tubes 12 being expanded. The pressure increase within the pressurized section 44 and the pressure decrease within the evacuation section 42 is therefore strictly monitored since this pressure differential defines the strain rate which in conjunction with the elevated temperature allows for superplastic forming. The rate at which the pressure in the internal tubes 12 being expanded is increased and the pressure in the evacuation section 42 is decreased is set at predetermined rates which are determined experimentally for the particular structure involved.

With the application of the elevated temperature along with increased pressure in the pressurized section 44 and decreased pressure in the evacuation section 42, the internal tubes 12 are forced to superplastically expand. This superplastic expansion continues so as to cause the walls of the internal tubes 12 to contact the top sheet 16, the pan 14, or an adjacent internal tube 12 which has also expanded. While the internal tubes 12 may be of any tubular cross-sectional shape initially, their superplastic expansion process forces the internal tubes 12 into substantially rectangular supporting ribs 49 within the pan 14 and the top sheet 16 as shown in FIG. 8. Upon contacting the top sheet 16, the pan 14, or an adjacent internal tube 12, the superplastically expanded internal tube 12 begins to diffusion bond with the metallic surface with which it is in contact. As is well known to those skilled in the art, the quality of the diffusion bonding between the metallic surfaces so as to cause a solidstate joining of the surfaces will continue to improve so long as sufficient heat and pressure is applied for an appropriate time duration.

Once the superplastically expanded internal tube 12 has contacted the top sheet 16 or the pan 14, the continued application of elevated pressure in the pressurized section 44 will force the internal tubes 12 along with the top sheet 16 and pan 14 to continue to expand until they contact the limiting structure 46. The limiting structure 46 therefore dictates the resulting shape of the formed metallic structural panel 48 since the fabrication assembly 10 will continue to expand due to the increased temperature and pressure until it fills the limiting structure 46. As previously discussed, the limiting structure 46 must be constructed of materials which remain rigid at the formation temperature for the structural panel 48.

Once the metallic structural panel 48 has superplastically formed and diffusion bonded, both the pressurized section 44 and the evacuation section 42 are returned to atmospheric pressure and the structure is removed from the elevated temperature environment. The fabrication assembly 10 may also be removed from the limiting structure 46. The portion of the fabrication assembly 10 which is between the two end plates 18 may now be utilized as a completed metallic structural panel 48. The remaining portions of the fabrication assembly 10, including the two end plates 18, may be trimmed from the assembly 10 to leave only the portion between the end plates 18. The flanged section 26 of the pan may also be trimmed to form a generally rectangular metallic structural panel 48.

In certain instances, such trimming may be unnecessary as the flanged section 26 may be utilized to connect the structural panel 48 to another structure. Alternatively, the endplates 18 may be utilized to connect a coolant source, for example, to the now expanded internal tubes 12.

The metallic structural panel fabrication process described heretofore, utilizing any embodiment of the fabrication assembly, is also capable of making panels which are highly curved, such as those required for the leading edge of an aircraft. The process required to make such curved shapes is similar to that previously described with slight modifications in the shape of the assembly's components.

Once the desired shape of the metallic structural panel is determined, the top sheet 86 and the pan 88 are formed such that the curvature of the top sheet 86 and the face sheet section 90 of the pan 88 match the desired shape. In a first embodiment 92 of the fabrication assembly for making a curved panel, the end plates 94 are also formed to the desired shape. The straight interior tubes 96, affixed to the end plates 94 as previously described, are next placed in the pan 88 and the end plates 94 are affixed to the pan 88 such that the interior tubes 96 are orthogonal to the radii of curvature established by the pan 88, top sheet 86, and the end plates 94.

Figure 9:
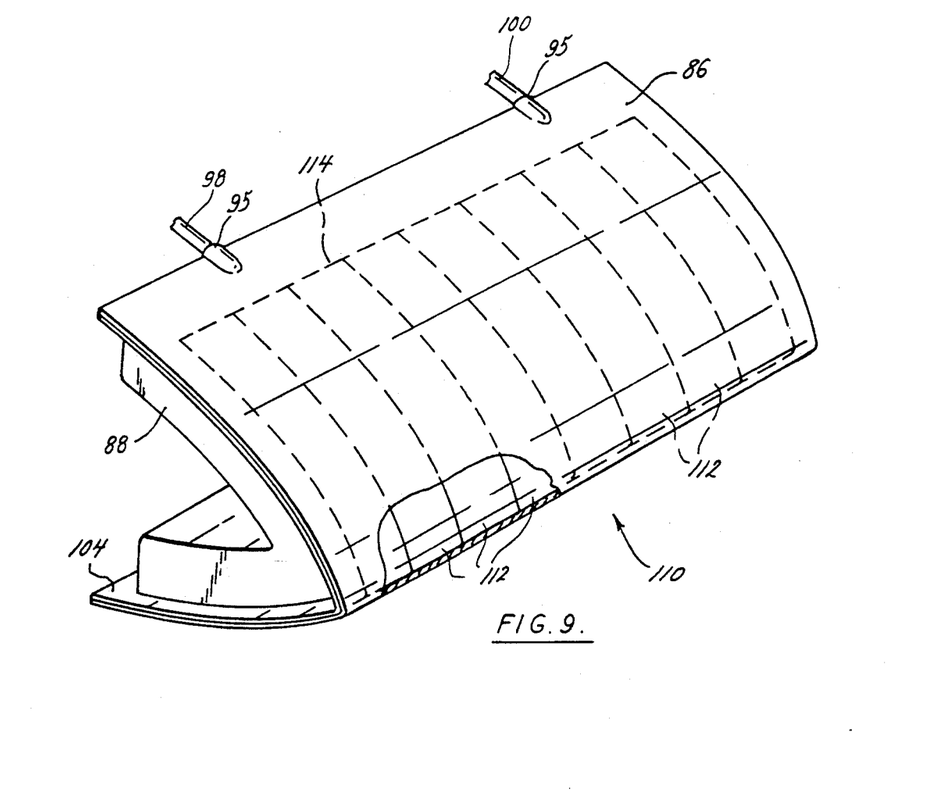
FIG. 9 is a perspective view of a second embodiment of a fabrication assembly for manufacturing a curved metallic structural panel.

In an alternative embodiment for making curved panels, illustrated in FIG. 9, the supporting ribs may be formed to also have the desired curved shape. In order to form such a panel, the top sheet 86 and the pan 88 are once again formed to the desired curved shape. The internal tubes 112 are also formed to hold the desired curved shape while the end plates 114 are planar. The tubes 112 are once again affixed to the end plates 114 and the end plates 114 are in turn affixed in the pan 88 such that the end plates 114 are orthagonal to the radii of curvature established by the pan 88 and top sheet 86 while the tubes 112 follow the radius of curvature established by the pan 88 and top sheet 86.

In either embodiment, following the placement of the evacuation 98 and expansion 100 tubes through holes 95 in a like manner to that described previously, the top sheet 86 is affixed to the pan 88. The assembly is next placed in a limiting structure 102, as shown in FIG. 10 which, for purposes of illustration, depicts the first embodiment for making curved panels which utilizes straight interior tubes, which is formed in a similar shape to the top sheet 86 and pan 88 so that upon the superplastic expansion of the internal tubes 96, the sandwich structure will retain the desired curved shape. Subsequently, the fabrication assembly 92 is superplastically formed and diffusion bonded in a manner identical to that previously described. Upon the completion of the superplastic forming, the pressure differential and the elevated temperature are removed. The fabrication assembly 92 is removed from the limiting structure 102 and the portion of the assembly 92 that is not between the end plates 94, along with the flanged section 104 of the pan 88, is again trimmed from the assembly 92. The resulting curved metallic structural panel 107, as shown in FIG. 11, retains the desired curved shape originally imposed upon the top sheet 86, pan 88, and end plates 94 while being internally reinforced by the superplastically expanded and diffusion bonded internal tubes 96 which have formed generally rectangular supporting ribs 106 within the panel 107 as described previously.

Upon the completion of the superplastic expansion, removal of the limiting structure 102, and the appropriate trimming, the resulting metallic structural panel has generally rectangular supporting ribs which have a radius of curvature identical to that established by the outer face sheets—the top sheet 86 and the pan 88.

The metallic structural panel may be made as thick or as thin as desired. The width of the panel may be altered by a number of variables including the size of the cavity in the limiting structure, the depth of the pan and the size of the internal tubes. Therefore, as the pan is made deeper by increasing the height of the sidewalls, the resulting panel will be thicker since the interior tubes may superplastically expand more before contacting the pan and top sheet. Alternatively, a more shallow pan will form a thinner panel due the constraint on the amount by which the interior tubes may expand. As previously discussed, the limiting structure ultimately controls the final shape of the structure. Thus, by enlarging the limiting structure's cavity within which the fabrication assembly is placed, a thicker structural panel is formed due to the increased expansion allowed during the superplastic forming stage. Likewise, a smaller cavity within the limiting structure will more tightly constrain the expansion so that a thinner structural panel is formed.

The resulting metallic structural panel is composed of the outer face sheets, originating from the top sheet and the pan, and the internal ribs. The ribs form substantially parallel, rectangular passages which are not interconnected. The passages may also be used as a heat exchanger by utilizing the design of the passages to be adjacent to one another without being interconnected. To function as a heat exchanger, a first liquid having a first temperature is flowed through a first passage while a second liquid with a second temperature is flowed through an adjacent second passage. Due to the physical proximity of the passages, the liquid with the lower temperature will absorb heat from the liquid with the higher temperature so as to decrease the higher temperature while increasing the lower temperature. Thus, heat is exchanged between the two liquids.

The passages may also be utilized to provide enhanced heat transfer for the apparatus on which the metallic structural panel is utilized. The improved heat transfer may be accomplished by flowing liquid through the passages. The liquid may either absorb heat from a surface desired to be cooled or give heat to a surface desired to be heated. Thus, if heat is desired to be absorbed by the liquid from the surface, liquid which is cooler than the surface temperature is flowed through the passages. Likewise, if the surface is to be heated by the liquid, the liquid which is flowed through the passages must be warmer than the current surface temperature.

Figure 12:
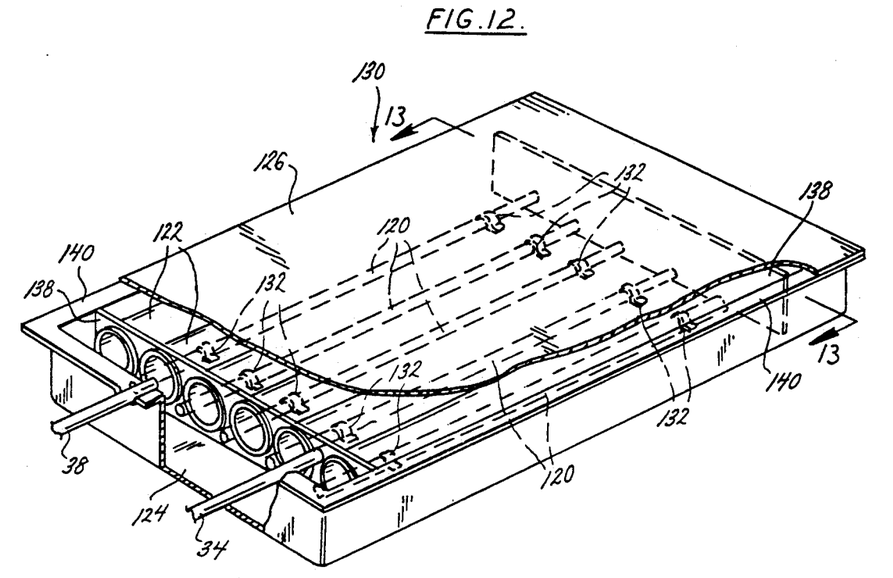
FIG. 12 is an perspective view in which a portion of the top sheet has been removed for clarity of an embodiment of a fabrication assembly for a metallic structural panel in which a network of coolant tubes have been introduced.

In circumstances necessitating large amounts of heat transfer from the surface of the metallic structural panel, the coolant which provides the best heat transfer capabilities may embrittle the metal forming the passages of the sandwich structure. An example of such a situation is the embrittlement caused when hydrogen or slush hydrogen is flowed through a metallic passage composed of a titanium alloy. Coolant passages thus need to be composed of a material, such as beryllium, which will not be embrittled by a coolant such as hydrogen or slush hydrogen, however, such materials are not typically able to be superplastically formed or diffusion bonded. Additionally, the coolant tubes should be constructed of a material which are thermally conductive so that they can provide heat transfer. Therefore, as shown in FIG. 12, a network of coolant tubes 120 may be provided in addition to the internal tubes 122 to provide the enhanced heat transfer without becoming embrittled.

Figure 13:
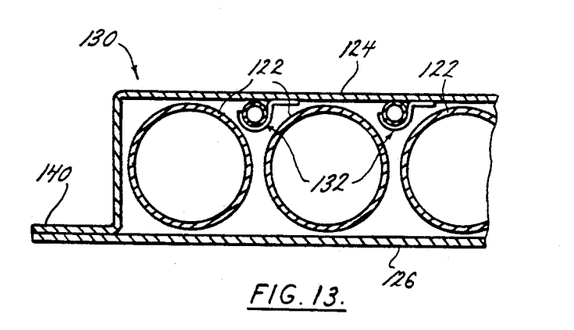
FIG. 13 is a sectional view of the fabrication assembly for a metallic structural panel utilizing a network of coolant tubes illustrating the function of the clip.
Figure 14:
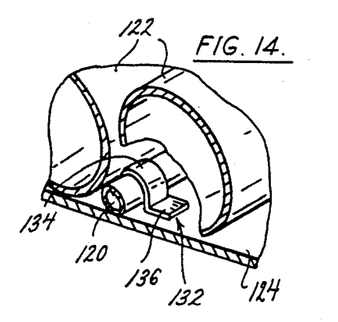
FIG. 14 is a fragmentary sectional view of the fabrication assembly for a metallic structural panel utilizing a network of coolant tubes illustrating the function of the clip.

The network of coolant tubes 120 provide optimal heat transfer if positioned adjacent to the face sheet section 124 of the pan 126 of the fabrication assembly 130. Since coolant tubes 120 are not generally diffusion bondable to the pan 126, mechanical means may be utilized to secure the coolant tubes 120. Such mechanical means may be a number of clips 132, which have a curved retaining portion 134, illustrated in more detail in FIGS. 13 and 14, and a tab 136. The curved retaining portion allows for an opening between itself and the surface to which it is mounted which is approximately equal in size to the exterior diameter of the cooling tube 120. The clips 132 are formed from a material, such as a titanium alloy, which can be rigidly affixed to the pan 126. The cooling tube 120 is placed under the opening 134 in the clip 132 and the tab 136 is subsequently affixed to the face sheet section 124 of the pan 126. A sufficient number of clips 132 are used in order to effectively secure the cooling tubes 120 to the pan 126, although a single clip 132 may be sufficient to secure the cooling tubes 120 to the pan 126 in certain circumstances.

The cooling tubes 120 have a length which is slightly less than that of the internal tubes 122. The cooling tubes 120 are positioned to run lengthwise within the pan 126 so as to be substantially parallel with the internal tubes 122 which will subsequently be placed in the pan 126. Additionally, the cooling tubes 120 are centered within the pan 126 such that when the end plate 138 and internal tube 122 combination is placed in the pan 126, the cooling tubes 120 will be located entirely between the end plates 138. The cooling tubes 120 are also placed along approximately parallel lines within the pan 126 that are approximately halfway between the center axes of adjacent internal tubes 122. Due to the placement of the cooling tubes 120 between adjacent internal tubes 122, the number of cooling tubes 120 utilized is typically one less than the number of interior tubes 122 although the number of cooling tubes 120 may be substantially more or less than this number. The exterior diameter of the cooling tubes 120 is selected to be such that the cooling tubes 120 do not interfere with the internal tubes 122 when both are positioned within the pan 126 during the assembly process. Also, the walls of the cooling tubes 120 must be thick enough to be able to sustain the superplastic forming process with negligible alteration in size or shape. Most suitable materials, such as beryllium, for constructing a cooling tube 120 have a relatively large physical strength, however, in comparison to superplastic forming materials, such as titanium alloys.

Following the placement of the cooling tubes 120 in the clips 132 and the welding of their tabs 136 to the face sheet section 124 of the pan 126 which occurs as the initial step, the formation process and the requisite components of the fabrication assembly 130 are identical to that previously described for all of the embodiments of the fabrication assembly including those which form curved panels. The cooling tubes 120 utilized are straight for all of the embodiments of the fabrication assembly except for the alternative embodiment 110 of the fabrication assembly for making a curved panel. In this embodiment 110, the cooling tubes 120, like the interior tubes 122, are formed to have the desired curved shape prior to their attachment to the top sheet 140 which also has the same curved shape. The cooling tubes 120 in this embodiment are attached to the top sheet 140 so that they follow the radii of curvature established by the pan 126 and top sheet 140 in an identical manner to that of the interior tubes 122.

The superplastic forming and diffusion bonding process for a fabrication assembly 130 containing cooling tubes 120 is identical to that previously described for the alternative embodiments of the fabrication assembly. The cooling tubes 120, which do not superplastically form or diffusion bond, are essentially encapsulated by the superplastically forming metal of the interior tubes 122 which form substantially rectangular supporting ribs 125. The cooling tubes 120, however, are designed to have sufficient strength to retain their tubular shape and size.

Figure 15:
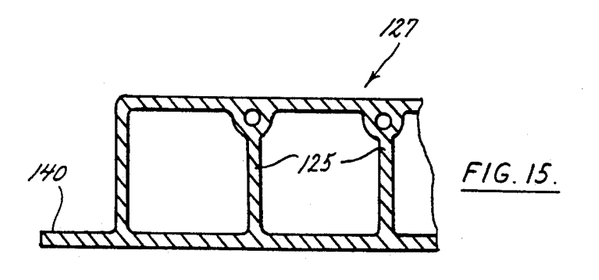
FIG. 15 is a sectional view of a metallic structural panel utilizing a network of cooling tubes following superplastic forming and diffusion bonding.

After the fabrication assembly 130 with cooling tubes has been removed from the limiting structure, the assembly 130 is trimmed to remove all of the material which is not between the two end plates 138 as well as the flanged edge 140 of the pan 126. If the tubular openings of the coolant tubes 120 are exposed following the trimming, as shown in FIG. 15, the structural panel 127 is complete, however, if an opening of a coolant tube 120 is not exposed, but still encapsulated by the metallic material instead, additional trimming is required. The additional trimming is performed by removing thin slices of the encapsulating metallic material along a direction perpendicular to the center axis of the cooling tubes 120 and the passages formed by the superplastically formed interior tubes 122 until the openings for all cooling tubes 120 are exposed at both ends of the metallic structural panel 127.

Once the structural panel 127 with cooling tubes 120 is utilized as a portion of an apparatus, the cooling tubes 120 are used to flow a coolant such as hydrogen or slush hydrogen which will remove the heat accumulated by the surface of the structural panel 127. The thermally conductive cooling tubes 120 will thus provide enhanced heat transfer while not becoming embrittled by the coolant.

Although there has been illustrated and described specific detail and structure of operations, it is clearly understood that the same were merely for purposes of illustration and that changes and modifications may be readily made therein by those skilled in the art without departing from the spirit and the scope of this invention.

We claim:

1. An assembly for fabricating a metallic structural panel, comprising:
   a) a housing defining an internal cavity;
   b) a plurality of internal tubes having superplastic properties disposed within said housing;
   c) a means for segregating said internal cavity into a pressurized section and an evacuation section; and
   d) means for establishing a pressure differential between said pressurized section and said evacuation section.

2. An assembly for fabricating a metallic structural panel as recited in claim 1 wherein said segregating means is a first end plate and a second end plate, said first and second end plates having a plurality of openings therein.

3. An assembly for fabricating a metallic structural panel as recited in claim 2 wherein said first end plate is affixed to a first end of said plurality of internal tubes such that said openings of said first end plate and said plurality of internal tubes are substantially aligned and said second end plate is affixed to a second end of said plurality of internal tubes.

4. An assembly for fabricating a metallic structural panel as recited in claim 3 wherein said second end plate is affixed to a second end of said plurality of internal tubes such that said openings of said second end plate and said plurality of internal tubes are substantially aligned.

5. An assembly for fabricating a metallic structural panel as recited in claim 4, wherein said tubes are comprised of a material selected from the group consisting of titanium alloy and aluminum alloy.

6. An assembly for fabricating a metallic structural panel as recited in claim 5, further comprising a plurality of cooling tubes disposed within said internal cavity.

7. An assembly for fabricating a metallic structural panel, comprising:
   a) a housing defining an internal cavity;
   b) a plurality of internal tubes having superplastic properties disposed within said housing, wherein said tubes are comprised of a material selected from the group consisting of titanium alloy and aluminum alloy;
   c) a means for segregating said internal cavity into a pressurized section and an evacuation section, wherein said segregating means is a first end plate and a second end plate, said first and second end plates having a plurality of openings therein, wherein said first end plate is affixed to a first end of said plurality of internal tubes such that said openings of said first end plate and said plurality of internal tubes are substantially aligned and said second end plate is affixed to a second end of said plurality of internal tubes, and wherein said second end plate is affixed to a second end of said plurality of internal tubes such that said openings of said second end plate and said plurality of internal tubes are substantially aligned;
   d) a means for establishing a pressure differential between said pressurized section and said evacuation section; and
   e) a plurality of cooling tubes comprised of beryllium and disposed within said internal cavity.

8. A method for fabricating a metallic structural panel, comprising the steps of:
   a) placing a fabrication assembly of a metallic structural panel in a containment die;
   b) depressurizing an evacuation section of an internal cavity of said fabrication assembly to a relatively low pressure and pressurizing a pressurized section of said internal cavity to a relatively high pressure such that a pressure differential exists between said evacuation section and said pressurized section of said fabrication assembly; and
   c) heating said fabrication assembly such that a plurality of tubes of said fabrication assembly superplastically form and diffusion bond to a housing and adjacent tubes of said fabrication assembly.

9. A method for fabricating a metallic structural panel as recited in claim 8, further comprising the step of purging said internal cavity of said fabrication assembly of substantially all oxygen contained therein prior to said pressurizing step.

10. A method for fabricating a metallic structural panel as recited in claim 9, further comprising the step of trimming said fabrication assembly following said heating of said fabrication assembly.

11. A method for fabricating a metallic structural panel as recited in claim 10, further comprising the steps of:
   a) cooling said fabrication assembly following the superplastic formation and diffusion bonding of said plurality of tubes;
   b) equalizing said pressure between said evacuation section and said pressurized section of said cooled fabrication assembly;
   c) removing said fabrication assembly from said containment die prior to said trimming step.

12. A metallic structural panel, comprising:
   a) a first outer face sheet;
   b) a second outer face sheet; and
   c) a plurality of ribs interconnecting said first and second outer face sheets so as to define a plurality of passageways,
   wherein said metallic structural panel is formed by the process of claim 8.

13. A metallic structural panel as recited in claim 12 wherein the process by which the metallic structural panel is formed further comprises the steps of:
   (a) purging said internal cavity of said fabrication of assembly of substantially all oxygen contained therein prior to said pressurizing step;
   (b) cooling said fabrication assembly following the superplastic formation and diffusion bonding of said plurality of tubes;
   (c) equalizing said pressure between said evacuation section and said pressurized section of said cooled fabrication assembly; removing said fabrication assembly from said containment die; and (d) trimming said fabrication assembly following said heating of said fabrication assembly.

14. A metallic structural panel, comprising:
   a) a first outer face sheet;
   b) a second outer face sheet;
   c) a plurality of ribs interconnecting said first and second outer face sheets so as to define a plurality of passageways; and
   d) a plurality of cooling tubes disposed within said plurality of ribs,
   wherein said metallic structural panel is formed by the process of claim 8.

15. A metallic structural panel as recited in claim 14 wherein the process by which the metallic structural panel is formed further comprises the steps of:
   (a) purging said internal cavity of said fabrication of assembly of substantially all oxygen contained therein prior to said pressurizing step;
   (b) cooling said fabrication assembly following the superplastic formation and diffusion bonding of said plurality of tubes;
   (c) equalizing said pressure between said evacuation section and said pressurized section of said cooled fabrication assembly; removing said fabrication assembly from said containment die; and (d) trimming said fabrication assembly following said heating of said fabrication assembly.

16. The method for fabricating a metallic structural panel as recited in claim 8, further comprising the step of gradually increasing the relatively high pressure within said evacuation section while gradually decreasing the relatively low pressure within said evacuation section during said heating step.

* * * * *